May 5, 1970    L. R. WRIGHT    3,510,026

LIQUID METERING CONTROL FOR A LAUNDRY APPLIANCE

Filed May 20, 1968

United States Patent Office 3,510,026
Patented May 5, 1970

3,510,026
LIQUID METERING CONTROL FOR A LAUNDRY APPLIANCE
Lew Richard Wright, Benton Harbor, Mich., assignor to Whirlpool Corporation, Benton Harbor, Mich.
Filed May 20, 1968, Ser. No. 730,550
Int. Cl. B67d 5/30
U.S. Cl. 222—20          2 Claims

ABSTRACT OF THE DISCLOSURE

An electronic control system for automatically adding a predetermined quantity of liquid to fabrics within a laundry appliance at a selected time or in response to sensed conditions. The control system utilizes a thyristor ring counter to electronically count the number of measured quantities or "charges" of liquid added as preset by an operator and thereafter terminates any further additions of liquid.

BACKGROUND OF THE INVENTION

Contemporary laundry appliances require many special cycles to properly clean and finish the increasing variety of fabrics, both man-made and natural which have become available of late. Many of these cycles require a dependable system to meter a predetermined quantity of liquid to the fabrics at selected times during the cycle or in response to sensed conditions. For example, during the final rinse operation in an automatic washer, it is often desirable to meter a preset amount of a rinse additive into the rinse water. In a domestic clothes dryer, future fabric finishing cycles may require the addition of a predetermined amount of liquid which will, for example, render the clothing being dried water repellent.

The growing demand for clothing of the "permanent press" type has led to a host of new cycles designed specifically for such treated fabrics. Since the new "permanent press" fabrics are the most wrinkle free if removed from the dryer immediately after drying cycle termination, future dryers may include control means to automatically delay cycle termination until the housewife arrives, whereupon the drying operation will be finished quickly. This would require the addition of small amounts of water as needed near the end of the drying cycle to insure that clothing wouldn't be damaged by overdrying.

Present day "damp dry" cycles are not wholly satisfactory since the dryer is merely terminated prior to complete drying of the clothing. This results in heavy areas, such as cuffs and pockets, being too damp while the bulk of the fabric to be ironed is too dry. Thus, future damp dry cycles desirably will involve complete drying of the clothing, followed by introduction of water into the drying chamber. The clothing may then be tumbled in the hot, damp atmosphere to assure uniform dampening. This cycle again involves addition of liquid to the clothing load in controlled amounts.

SUMMARY

In light of such present and future cycles requiring addition of liquids to clothing being laundered, this invention provides a highly reliable electronic control system, utilizing solid state components, which meters a preset quantity of liquid at a specified time or in response to sensed conditions. It basically comprises an electronic counter which counts the number of times a discrete, measured quantity or "charge" of liquid is added to the laundry appliance and terminates further "charges" after a number, preset by the operator, have been added.

The electronic counter is a thyristor ring counter which advances one stage each time liquid is added. The first stage in the ring counter to be rendered conductive is preset via a rotary switch thereby determining how many "charges" of liquid are counted before the ring counter reaches the last stage, whereupon it stops the addition of further "charges." The "charges" are measured in a tank of fixed volume to which liquid is admitted via an electrically controlled valve until a level detector senses the tank to be full. The valve is then closed and the liquid drains therefrom. The filling operation takes place only when initiated by timer or condition responsive circuitry.

Being electronic in nature, the control system of this invention is more reliable than prior art, electro-mechanically-based systems. Also, the total amount of liquid added can easily be varied by adjustment of a single switch.

DESCRIPTION OF THE PREFERRED EMBODIMENT

Figure 1:
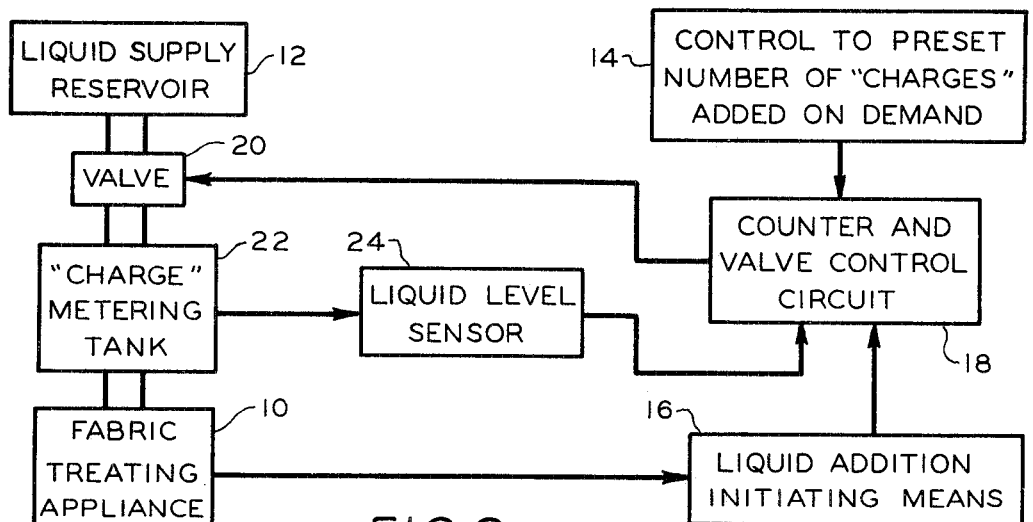
FIG. 1 is a schematic block diagram of the liquid metering control system of this invention.

Turning now to the schematic block diagram of FIG. 1, liquid to be metered into a fabric treating appliance 10 is stored in a liquid supply reservoir 12. Prior to operation of appliance 10, a selector 14 is set thereby determining the number of discrete measured quantities or "charges" of liquid to be added to appliance 10 from reservoir 12. The cycle of operation for appliance 10 is next initiated. When either the timer controlling appliance 10 or a sensed condition indicates the desirability of adding liquid to appliance 10, a liquid addition initiating means 16 signals a counter and valve control circuit 18. Circuit 18 now opens a valve 20 whereupon liquid passes from reservoir 12 into a charge metering tank 22. When a liquid level sensor 24 senses a predetermined amount of liquid to be present in tank 22, it signals circuit 18. Circuit 18 now terminates power to valve 20 and the measured amount of liquid in tank 22 passes into appliance 10. An electronic counter in circuit 18 records each time valve 20 is opened, thereby filling tank 22. Upon drainage of tank 22, sensor 24 transmits a second signal to circuit 18. Circuit 18 now opens valve 20 a second time and liquid flows into tank 22. As before, sensor 24 causes circuit 18 to close valve 20 upon filling of tank 22 and the contents of tank 22 then passes into appliance 10. After the number of "charges" preset by selector 14 have been added to appliance 10, circuit 18 no longer opens valve 20 and the liquid metering operation is complete.

Figure 2:
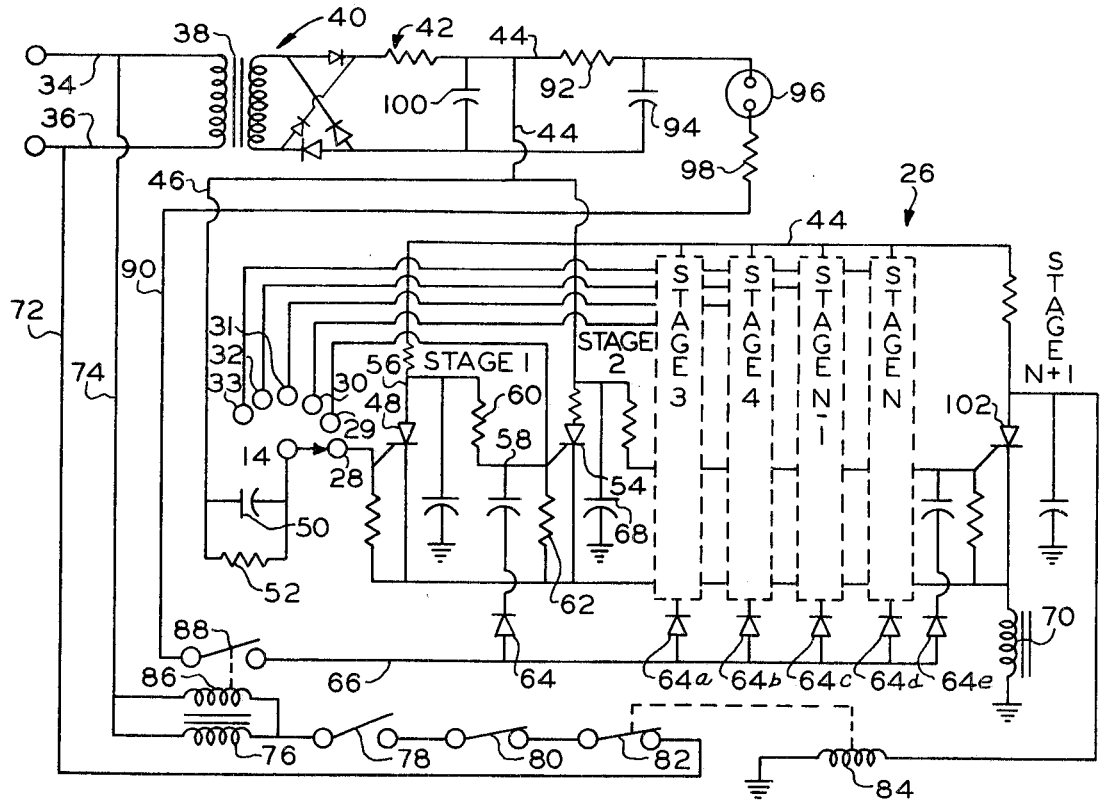
FIG. 2 is a schematic circuit diagram of the liquid metering control circuit of the invention.

Shown in the schematic diagram of FIG. 2, is the detailed circuitry of the liquid metering control. A thyristor ring counter 26 consisting of N+1 stages is used to count the number of "charges" of liquid added to appliance 10 during each cycle of operation. The stage at which counter 26 begins counting is altered by presetting selector 14. If, for instance, two charges of liquid are to be added to appliance 10, the first stage of counter 26 to be activated is STAGE N−1. This is accomplished by setting selector 14 at a contact 32. Alternately, if a large quantity of liquid is to be metered to appliance 10 requiring N charges, selector 14 is set to the contact 28 and counter 26 begins counting at STAGE 1.

Assuming that the operator does wish to have N charges of liquid added, selector 14 is set at contact 28 as shown on FIG. 2. When AC power is applied to a pair of terminals 34 and 36, a full wave DC supply consisting of a transformer 38, a full wave bridge 40 and a filtering network 42 provides a filtered DC potential of 25 volts on a line 44. A gating pulse is now transmitted from line 44 along a line 46 to a gating circuit consisting of a capacitor 50, a resistor 52 and selector 14 into the gate electrode of a thyristor 48. Since resistor 52 is of a high value, as soon as capacitor 50 charges, insufficient current passes through parallel connected resistor 52 and capacitor 50 to gate on thyristor 48. However, with capacitor 50 uncharged, as it is when power is first supplied on line 46, capacitor 50 passes sufficient current to gate thyristor 48. (Note that if selector 14 had initially been set to contact 29, this initial gating signal would be transmitted to a thyristor 54 in STAGE 2 of counter 26.) Thyristor 48 now goes into conduction and the voltage at its anode (point 56) drops to a low value, on the order of 0.1 volt. The voltage at a point 58 is even lower due to the resistive divider network formed by a pair of resistors 60 and 62. Thus, a diode 64 is back biased by less than 0.1 volt. However, diodes corresponding to all other stages in the ring counter (the diodes 64a, 64b, 64c, 64d, 64e) are back biased by approximately 15 volts since all other thyristors in counter 26 are out of conduction. If a pulse of magnitude greater than 0.1 volt but less than 15 volts appears on a line 66, diode 64 would conduct this pulse to the gate of thyristor 54 while all other diodes would block the pulse from the gates of their respective thyristors.

When a pulse is conducted to the gate of thyristor 54, it begins to turn on and a capacitor 68 (which has charged to approximately 24 volts due to the high anode voltage of thyristor 54 while it was out of conduction) discharges through thyristor 54 into an inductor 70. A large reverse voltage pulse now appears across inductor 70 and reverse biases thyristor 48 thereby causing it to turn off. This process repeats each time a pulse appears on line 66 until counter 26 advances to STAGE N+1.

Power applied at terminals 34 and 36 is also transferred along a pair of lines 72 and 74 to an actuation circuit for a valve solenoid 76 which operates valve 20. Note that in series with solenoid 76 are three other components: a normally open switch 78, a liquid level sensing switch 80 and a normally closed contact 82 of a relay 84. Switch 80 is associated with the liquid level sensing means 24 shown on FIG. 1. One embodiment of switch 80, which would function properly in the circuitry of FIG. 2, would be a pressure switch which would open when tank 22 was completely filled with liquid and close upon draining of tank 22. Various other liquid level switches could be used in place of a pressure switch.

Switch 78 is associated with the liquid addition initiating means 16. When liquid is to be added to appliance 10, the addition is initiated by the closing of switch 78 by means 16. If, for example, the liquid metering system were to be used with an automatic washer to admit a rinse additive to the rinse bath, switch 78 could be a timer contact closed at initiation of the rinse cycle. Alternatively, if the liquid metering control were to be used with a clothes dryer, switch 78 could be a normally open thermostat located in the exhaust duct of the dryer. As the clothing became dry, the exhaust duct temperature would rise and the thermostat would close. This would cause addition of liquid to the dry clothing within the drum, thereby either retaining them in a moist condition until the housewife could arrive and initiate completion of the cycle of operation with an appropriate control or add liquid to the clothing within the drum thereby dampening it prior to an ironing operation upon removal of the clothing. As a third alternative, switch 78 could be a cam-operated switch within the timer of a clothes dryer. When a liquid, such as a water repellent, was to be added to the clothing, the timer would close switch 78 and the liquid metering circuit would meter the proper amount of water repellent into the drum of the dryer. Thus, it can be seen that the instant liquid metering control has a variety of applications in conjunction with special cycles used on a laundry appliance.

Initially tank 22 is empty and switch 80 is closed. Contact 82 is also closed since relay 84 is not energized until the ring counter has advanced to STAGE N+1. When switch 78 closes, solenoid 76 is energized and it remains energized until switch 80 opens in response to a signal from sensor 24 indicating that tank 22 is full. Switch 80 opens breaking power to solenoid 76. Liquid now drains from tank 22 into appliance 10.

When valve solenoid 76 was energized, a relay 86 was also energized. This relay closed switch 88.

Referring now to network 42 in FIG. 2, note that a resistor 92 and a capacitor 94 are connected in series across a filter capacitor 100 in network 42. Since resistor 92 is of a large ohmic value, capacitor 94 will charge slowly from capacitor 100. When contact 88 is closed by relay 86, a neon lamp 96 and a current limiting resistor 98 are connected to ground through one of the diodes 64, 64a, 64b, 64c, 64d, 64e which corresponds to the next stage of counter 26 to be rendered conductive, through the gate-cathode junction of the thyristor in that state and through inductor 70. Thus, neon lamp 96 ionizes and delivers a gating pulse to line 66 through contact 88. Before capacitor 94 can again charge to the ionization potential of neon lamp 96, switch 88 opens as relay 86 is de-energized upon complete drainage of tank 22. Thus, each time solenoids 76 and 86 are actuated, counter 26 advances one STAGE. The liquid metering control continues to add measured "charges" of liquid until counter 26 advances to STAGE N+1. Relay 84 is then energized through a thyristor 102, thereby opening contact 82. Solenoid 76 can now no longer be actuated. Thus, by presetting selector 14, the number of measured amounts of liquid to be added to appliance 10 can easily be present.

While one embodiment of the invention has been shown and described, it is to be understood that it is capable of many modifications. Changes in the construction and arrangement may be made without departing from the spirt and scope of the invention as defined in the appended claims. The embodiments of the invention in which an exclusive property or privilege is claimed are defined as follows:

What is claimed is:

1. In a fabric treating apparatus a control system for controlling the addition of a preset amount of liquid to fabrics contained within said apparatus comprising,
    (a) metering means for measuring a discrete quantity of liquid to be added to said fabrics including a metering tank having a pressure responsive switch associated therewith, said switch being movable from a first to a second position in response to a predetermined liquid level in said tank and an electrically actuated valve connected with said pressure-responsive switch and said tank whereby said valve terminates the flow of liquid to said tank in response to transfer of said switch to said second position,
    (b) counter means for counting the number of times said discrete quantity of liquid is added to said fabrics including a thyristor ring counter having a plurality of discrete stages and pulse generating means for advancing said ring counter
    (c) counter initiation means for pre-selecting any stage of said counter at which said counting operation is initiated, and (d) termination means connected with said counter means for terminating the addition of liquid after said amount, corresponding to said preselected stage, has been added including a first relay coil connected with the final stage of said ring counter for actuation therefrom and a first switch controlled by said first relay coil and connected with said electrically actuated valve whereby liquid flow to said metering tank is terminated when the final stage of said ring counter is rendered conductive.

2. The control system of claim 1 wherein said pulse generating means includes a second relay coil connected with said pressure actuated switch and a second switch, controlled by said second relay coil, connected with said ring counter whereby said ring counter is advanced each time said pressure actuated switch moves to said second position.

References Cited
UNITED STATES PATENTS

| | | | |
|---|---|---|---|
| 2,137,928 | 11/1938 | Tanqueray | 222—14 X |
| 2,651,318 | 9/1953 | Cates | 222—17 |
| 2,755,966 | 7/1956 | Lindars | 222—76 |
| 3,088,315 | 5/1963 | Withers | 222—14 X |
| 3,133,726 | 5/1964 | Tarukawa | 222—67 X |
| 3,220,607 | 11/1965 | Seal | 222—54 |
| 3,348,071 | 10/1967 | Chamberlin | 328—43 X |

ROBERT B. REEVES, Primary Examiner

H. S. LANE, Assistant Examiner

U.S. Cl. X.R.

222—76; 328—43